United States Patent
Kobayashi

(10) Patent No.: US 11,232,606 B2
(45) Date of Patent: Jan. 25, 2022

(54) IMAGE PROCESSING WITH REDUCED INFLUENCE OF IMAGE SHOW-THROUGH BY CONVERSION PROCESSING INTO ONE OF AN ACHROMATIC COLOR AND A DESIGNATED CHROMATIC COLOR

(71) Applicant: CANON KABUSHIKI KAISHA, Tokyo (JP)

(72) Inventor: Masato Kobayashi, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 16/569,943

(22) Filed: Sep. 13, 2019

(65) Prior Publication Data

US 2020/0105027 A1    Apr. 2, 2020

(30) Foreign Application Priority Data

Sep. 28, 2018 (JP) .............................. JP2018-184984

(51) Int. Cl.
   *G06T 11/00* (2006.01)
   *G06T 7/90* (2017.01)
   *H04N 1/409* (2006.01)

(52) U.S. Cl.
   CPC .............. *G06T 11/001* (2013.01); *G06T 7/90* (2017.01); *H04N 1/4095* (2013.01)

(58) Field of Classification Search
   CPC ..................... G06T 11/001; G06T 7/90; G06T 2207/30176; G06T 5/005; G06T 5/20; G06T 2207/10008; G06T 2207/10024; H04N 1/4095; H04N 1/6008; H04N 1/6002; H04N 1/60; H04N 1/62
   See application file for complete search history.

(56) References Cited

U.S. PATENT DOCUMENTS

| | | | |
|---|---|---|---|
| 9,230,202 B2 | 1/2016 | Kobayashi | ........... H04N 1/6052 |
| 2006/0088208 A1 | 4/2006 | Nako et al. | ................... 382/162 |
| 2006/0188148 A1 | 8/2006 | Nako et al. | ................... 382/162 |
| 2012/0307270 A1* | 12/2012 | Nakajima | ................ H04N 1/56 |
| | | | 358/1.9 |
| 2015/0256715 A1 | 9/2015 | Ikari | ........................... 358/3.24 |
| 2018/0249044 A1* | 8/2018 | Ikari | .................. G03G 15/5025 |
| 2019/0394357 A1* | 12/2019 | Sugahara | ............. H04N 1/6027 |

FOREIGN PATENT DOCUMENTS

| | | |
|---|---|---|
| CN | 1313004 | 9/2001 |
| CN | 1512760 | 7/2004 |
| CN | 104917930 | 9/2015 |
| JP | 2012-249133 | 12/2012 |

OTHER PUBLICATIONS

Office Action dated Nov. 3, 2021 in counterpart Chinese Application No. 201910918695.4, together with English translation thereof.

* cited by examiner

*Primary Examiner* — Christopher Wait
(74) *Attorney, Agent, or Firm* — Venable LLP

(57) ABSTRACT

An image processing apparatus comprises a reading unit configured to read an image of an original; a correction unit configured to correct, based on variance values acquired for a pixel, the pixel in a region where a show-through has occurred, in the image read by the reading unit; a designation unit configured to designate a chromatic color; and a conversion unit configured to convert a pixel included in an image including the pixel corrected by the correction unit into one of a chromatic color and an achromatic color designated by the designation unit.

10 Claims, 11 Drawing Sheets

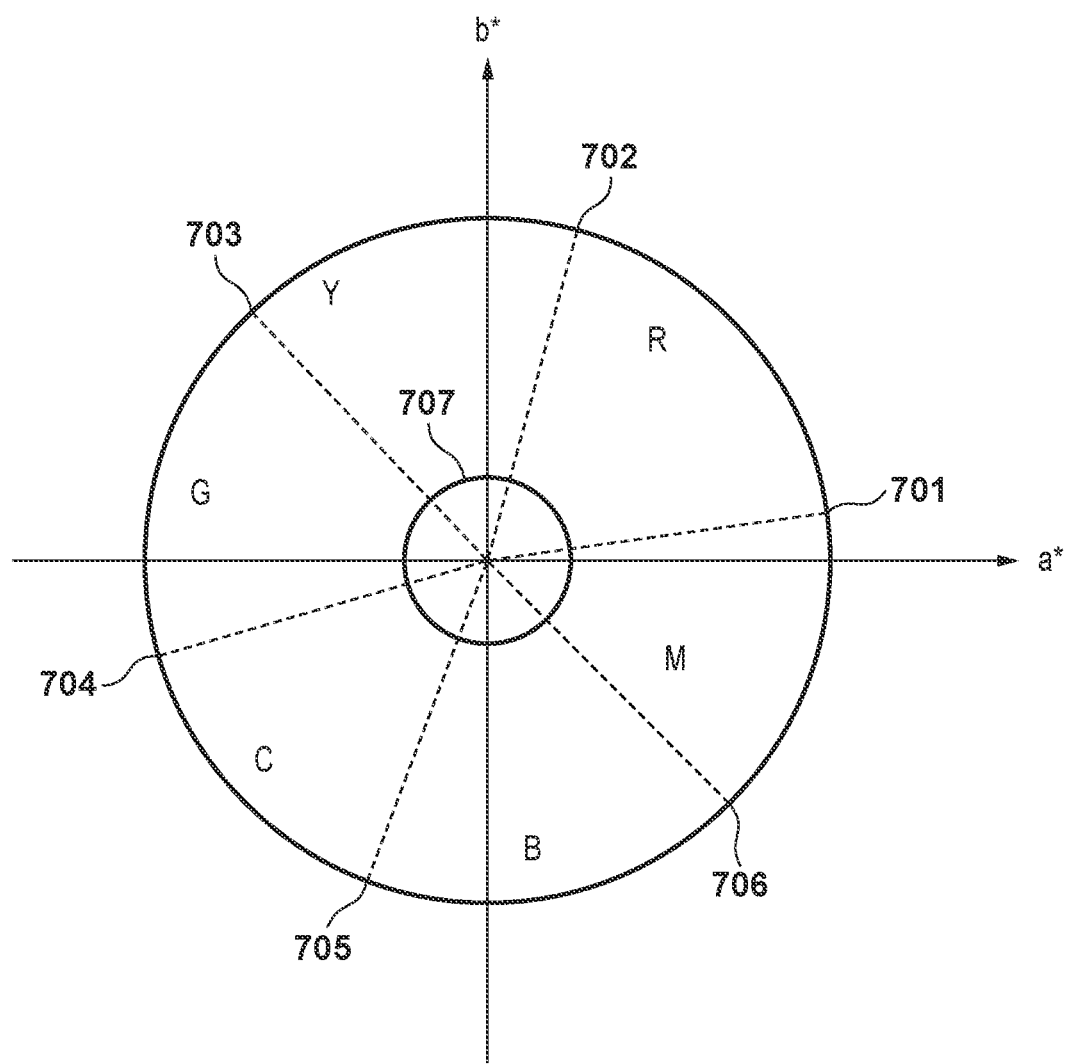

| R | G | B | L* | a* | b* |
|---|---|---|---|---|---|
| 0 | 0 | 0 | 16.37 | 0.30 | 0.06 |
| 0 | 0 | 255 | 26.19 | 8.98 | -40.48 |
| 0 | 255 | 0 | 51.93 | -46.02 | 39.40 |
| 0 | 255 | 255 | 60.01 | -28.96 | -24.63 |
| 255 | 0 | 0 | 44.01 | 61.37 | 39.68 |
| 255 | 0 | 255 | 49.97 | 60.86 | -2.80 |
| 255 | 255 | 0 | 87.62 | -5.48 | 92.33 |
| 255 | 255 | 255 | 100.00 | 0.00 | 0.00 |

803

| R | G | B | C | M | Y | K |
|---|---|---|---|---|---|---|
| 0 | 0 | 0 | 0 | 0 | 0 | 255 |
| 0 | 0 | 255 | 255 | 255 | 0 | 0 |
| 0 | 255 | 0 | 255 | 0 | 255 | 0 |
| 0 | 255 | 255 | 255 | 0 | 0 | 0 |
| 255 | 0 | 0 | 0 | 255 | 255 | 0 |
| 255 | 0 | 255 | 0 | 255 | 0 | 0 |
| 255 | 255 | 0 | 0 | 0 | 255 | 0 |
| 255 | 255 | 255 | 0 | 0 | 0 | 0 |

FIG. 9

| HUE/SATURATION | LOWER LIMIT VALUE | UPPER LIMIT VALUE |
|---|---|---|
| R | 10 | 80 |
| Y | 80 | 140 |
| G | 140 | 200 |
| C | 200 | 250 |
| B | 250 | 310 |
| M | 10 | 310 |
| SATURATION | 0 | 20 |

FIG. 10

| NO. | CHROMATIC/ACHROMATIC DETERMINATION FLAG | HUE RANGE INSIDE/OUTSIDE DETERMINATION FLAG | CONVERSION COLOR |
|---|---|---|---|
| 1 | 1 | 1 | DESIGNATED COLOR |
| 2 | 1 | 0 | ACHROMATIC COLOR |
| 3 | 0 | 1 | ACHROMATIC COLOR |
| 4 | 0 | 0 | ACHROMATIC COLOR | ns
IMAGE PROCESSING WITH REDUCED INFLUENCE OF IMAGE SHOW-THROUGH BY CONVERSION PROCESSING INTO ONE OF AN ACHROMATIC COLOR AND A DESIGNATED CHROMATIC COLOR

BACKGROUND OF THE INVENTION

Field of the Invention

The present invention relates to an image processing apparatus, a control method thereof, and a non-transitory computer-readable storage medium.

Description of the Related Art

In a copying machine, a CMYK four-color copy (to be referred to as a full color copy hereinafter) is generally performed. In this case, C, M, Y, and K indicate cyan, magenta, yellow, and black, respectively. The full color copy is expensive because coloring materials of four colors are required. Under this situation, a two-color copy receives a great deal of attention in which printing is performed by reducing the number of colors. In the two-color copy, portions near the chromatic color portions and achromatic color portions in a color original are printed in white, black, and gray, while the remaining chromatic color portions are printed using a color (for example, C, M, Y, R, G, or B) designated by the user. In this case, R, G, and B indicate red, green, and blue, respectively. The achromatic colors indicate colors which lack hues such as white, black, and gray, while the chromatic color indicates a color in which a particular hue predominates except the achromatic colors. As a method of performing the two-color copy, there is available a method of acquiring the saturations of a color original digitized by a reading apparatus such as a scanner, determining whether each pixel of the digital color original has a chromatic or achromatic color, and replacing the digital color original with the chromatic or achromatic color in accordance with the determination result, thereby printing the color original. The saturation indicates the intensity of a color. According to this method, all the pixels determined as chromatic colors are converted into the user's designated color. All colors except white, black, and gray are converted into the user's designated color.

Japanese Patent Laid-Open No. 2012-249133 proposes a method of calculating a hue indicating a color type in addition to the determination between the chromatic and achromatic colors by the saturation, determining a pixel converted into the user's designated color and a pixel converted into the achromatic color upon adding the determination of the color type, thereby performing the replacement of colors.

The above conventional technique poses the following problem. In the conventional technique, only a color corresponding to the user's designated color of the digital color original is converted into the chromatic color (user's designated color), and the remaining colors are converted into the achromatic color. For example, if the user's designated color is red, only a red portion of the original is converted into the user's designated color, and the remaining colors are converted into the achromatic color. This method also aims at emphasizing the portion of the user's designated color and facilitating readability of the printed result. For example, by converting only an original portion marked with a red pen into the user's designated color, the portion is more emphasized. By converting only the holiday portion of a calendar in which the weekdays and holidays are indicated by different colors into the user's designated color, thereby facilitating the indication of only the holidays.

On the other hand, if a double-sided copied original is to be copied, a phenomenon (to be referred to as a show-through hereinafter) in which an image printed on the reverse side is copied while being shown on the obverse side through the sheet. If the show-through occurs, the impression of the obverse image is changed, and the show-through is desirably unnoticeable. In a normal copy, in order to eliminate the difference, depending on the paper types, of under colors (the colors of the paper sheets themselves) of paper sheets, a color close to white is corrected (to be referred to as under color removal hereinafter). In the show-through, the image on the reverse side is shown on the obverse side and is seen unclearly. Accordingly, the show-through can be corrected by under color removal, thereby reducing the show-through. As a result, the show-through becomes unnoticeable in the full color copy. A problem that the impression of the obverse image changes does not occur in many cases. However, in the two-color copy, the determination to determine whether a pixel is to be converted into the user's designated color or the achromatic color for a show-through portion changes as compared with a case in which the show-through is absent. Accordingly, the pixel to be supposed to be converted into the user's designated color or the pixel supposed to be converted into the achromatic color is undesirably converted into the achromatic color or the user's designated color, thus posing the problem.

SUMMARY OF THE INVENTION

The present invention enables realization of implementing a mechanism for preferably reducing a show-through influence in conversion processing for converting a pixel into the user's designated color or the achromatic color in a two-color copy of a color original in which a show-through occurs.

One aspect of the present invention provides an image processing apparatus comprising: a reading unit configured to read an image of an original; a correction unit configured to correct, based on variance values acquired for a pixel, the pixel in a region where a show-through has occurred, in the image read by the reading unit; a designation unit configured to designate a chromatic color; and a conversion unit configured to convert a pixel included in an image including the pixel corrected by the correction unit into one of a chromatic color and an achromatic color designated by the designation unit.

Another aspect of the present invention provides a method of controlling an image processing apparatus, the method comprising: reading an image of an original; correcting, based on variance values acquired for a pixel, the pixel in a region where a show-through has occurred, in the image read in the reading; designating a chromatic color; and converting a pixel included in an image including the pixel corrected in the correcting into one of a chromatic color and an achromatic color designated in the designating.

Still another aspect of the present invention provides a non-transitory computer-readable storage medium storing a computer program to cause a computer to execute steps in a method of controlling an image processing apparatus, the method comprising: reading an image of an original; correcting, based on variance values acquired for a pixel, the pixel in a region where a show-through has occurred, in the image read in the reading; designating a chromatic color; and converting a pixel included in an image including the pixel corrected in the correcting into one of a chromatic color and an achromatic color designated in the designating.

Further features of the present invention will become apparent from the following description of exemplary embodiments (with reference to the attached drawings).

BRIEF DESCRIPTION OF THE DRAWINGS

FIG. 7 is a view showing an example of an a*b* plane of an L*a*b* space and a determination boundary on the a*b* plane;

FIG. 8 is a view schematically showing a color conversion table;

FIG. 9 is a view showing an example of a determination threshold table;

FIG. 10 is a table showing a combination of flag values and conversion in accordance with the combination;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that a multi function peripheral (digital multi function peripheral or MFP) exemplified as an image processing apparatus according to this embodiment will be described below. However, the present invention is applicable to an electrophotographic image processing apparatus such as a laser printer or a FAX apparatus without departing from the spirit and scope of the present invention. In addition, the present invention is not limited to the image processing apparatus as the application target, but is applicable to an information processing apparatus having neither an image forming function nor an image processing function.

First Embodiment

<Arrangement of Image Processing Apparatus>

The first embodiment of the present invention will be described below with reference to the accompanying drawings. An image forming system according to this embodiment is assumed as an MFP (Multi Function Peripheral) including an image processing apparatus 100, a scanner 110, a print engine 108, and a user interface (UI) 111. However, any apparatus is applicable to the image forming system of this embodiment if it has a print function.

Figure 1:
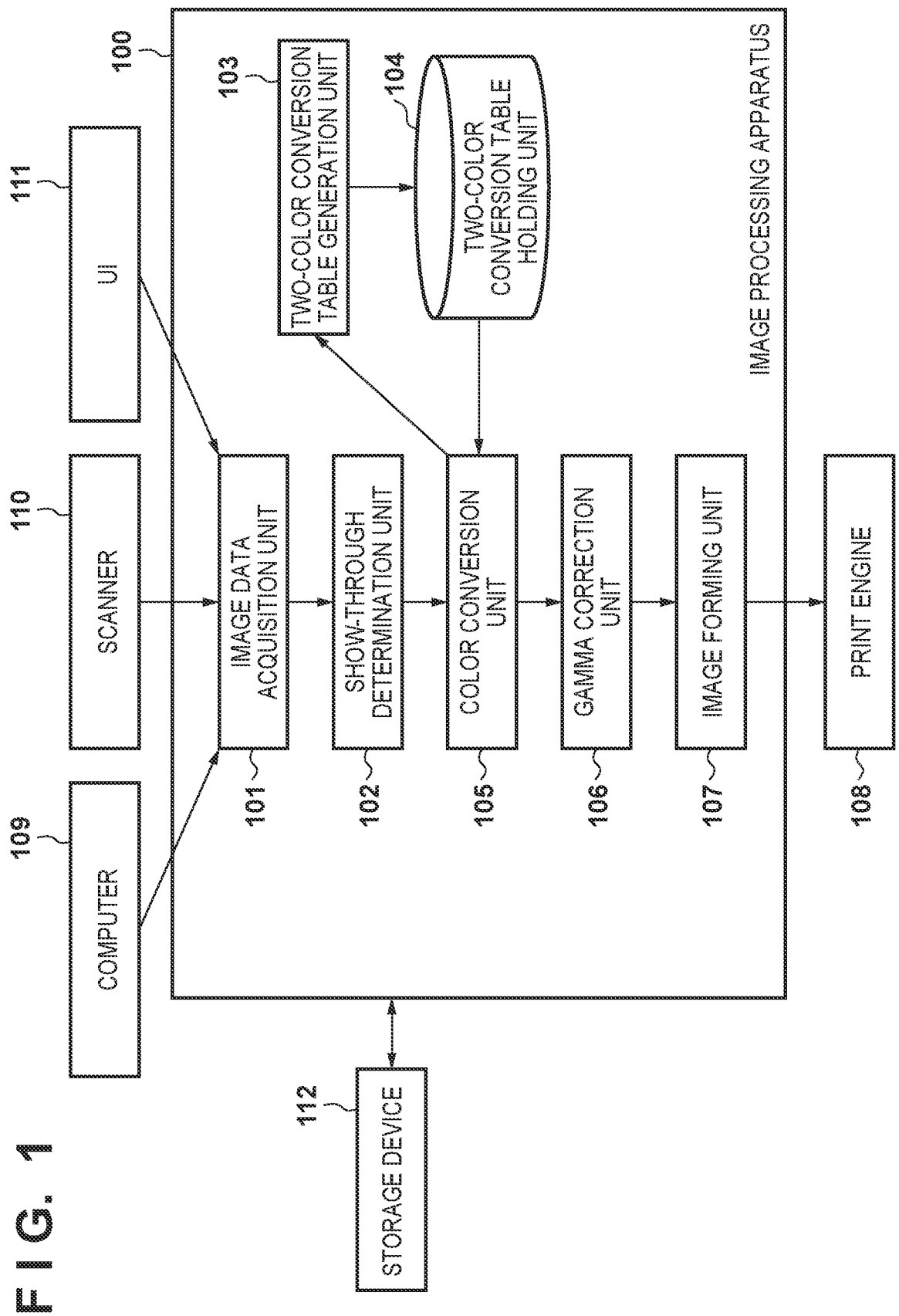
FIG. 1 is a block diagram showing an arrangement of an image processing apparatus according to an embodiment.

Referring to FIG. 1, an example of the arrangement of the image processing apparatus 100 will be described below.

The image processing apparatus 100 according to this embodiment includes an image data acquisition unit 101, a show-through determination unit 102, a two-color conversion table generation unit 103, a two-color conversion table holding unit 104, a color conversion unit 105, a gamma correction unit 106, an image forming unit 107, and the UI 111. Note that the UI 111 can include an external display, a keyboard, and a mouse. In order to acquire image data, the image processing apparatus 100 is connected to at least one of a computer 109 and the scanner 110. In order to print image data output from the image forming unit 107, the image processing apparatus 100 is connected to the print engine 108. In addition, the image processing apparatus 100 is connected to a storage device 112 such as an HDD.

The image data acquisition unit 101 acquires RGB image data generated from an original read by the scanner 110. Note that the RGB image data is exemplified in this embodiment, but any image data can be used if it is image data having a color space which can be converted into an L*a*b* space to be described later. In addition, the image data acquisition unit 101 acquires setting values transmitted from the UI 111. The setting values to be acquired are setting values of the user's designated color. In this embodiment, a designated color is assumed to be selected from six colors, that is, cyan (C), magenta (M), yellow (Y), red (R), green (G), and blue (B). The designated color to be selected is not limited to these six colors.

The show-through determination unit 102 determines whether each pixel of the RGB image data input from the image data acquisition unit 101 is a show-through pixel and assigns a show-through determination flag to each pixel. The show-through determination flag holds a value of "0" or "1". However, any other value may be used, or information may be added if a pixel is determined to be a show-through pixel. That is, it suffices whether a pixel is identified as a show-through pixel. A determination method will be described later in detail.

Based on the determination result of the show-through determination unit 102, the color conversion unit 105 corrects the pixel value of a pixel determined as a show-through pixel among the pixels of the RGB image data input from the image data acquisition unit 101. In addition, the color conversion unit 105 converts, for a pixel determined as the show-through pixel, a corrected pixel value into a predetermined color space, and converts, for a pixel determined not as the show-through pixel, the pixel value of the original RGB image data into the predetermined color space. Accordingly, the color conversion unit 105 determines whether each pixel is a pixel to be converted into the user's designated color or a pixel to be converted into the achromatic color. Note that the predetermined space is a color space such as the L*a*b* space or the LCH space having one achromatic color axis in, for example, a three-dimensional color space. In this embodiment, the pixel is converted into the L*a*b* space or the LCH space. The color space is not limited to a specific one. The pixel may be converted into a YUV space.

The L*a*b* space and the LCH space are visual uniform color spaces which are the device-independent three-dimensional color spaces in consideration of the human visual characteristics. In this embodiment, as shown in FIG. 7, determination is performed using two components except the achromatic-axis component in the three-dimensional color space. As shown in FIG. 7, the color components a*b* except the brightness component L* serving as the achromatic-axis component in the L*a*b* space are used. When a two-dimensional color plane (to be referred to as a hue plane hereinafter) defined by the two parameters corresponding to the two components associated with the hue is viewed from the above, the colors (C, M, Y, R, G, and B, and intermediate colors such as orange, pink, and purple) of the respective pixels can be determined. Based on the determination result representing that the pixel is converted into the user's designated color or the pixel is converted into the achromatic color, each pixel is converted into a CMYK value corresponding to the user's designated color or the achromatic color, thereby generating the CMYK image data.

Referring back to FIG. 1, the two-color conversion table generation unit 103 generates a two-color conversion table (for example, a lookup table form) used when performing color conversion using the color conversion table in the color conversion unit 105 to be described later. The two-color conversion table holding unit 104 holds, in the storage device 112, the two-color conversion table generated by the two-color conversion table generation unit 103 or the conversion table such as a full color conversion table, and sends the held table to the color conversion unit 105 or the like as needed.

The gamma correction unit 106 performs correction processing for keeping the tone characteristic in the print engine 108 constant for the CMYK image data sent from the color conversion unit 105. The image forming unit 107 performs control of converting the CMYK image corrected by the gamma correction unit 106 into halftone image data of N (integer) bits suitable for the printer and sending it to the print engine. Note that as halftone processing, although various methods such as a density pattern method, an ordered dither method, and an error diffusion method are proposed, any method can be employed in this embodiment. Note that the print engine 108 is an engine using CMYK toners in the following description, but may be an engine using CMYK inks.

<Two-Color Conversion Processing>

The processing sequence of two-color conversion processing associated with show-through determination, color determination, and color conversion according to this embodiment will be described with reference to FIG. 2. The processing to be described below is implemented such that a CPU 114 reads out, for example, programs stored in the storage device 112 connected to the image processing apparatus 100 to a RAM 113 and executes them.

In step S201, the image data acquisition unit 101 causes the CPU 114 to output a readout instruction to the scanner 110 to generate scanned image data by executing scanning of an original, thereby acquiring generated scanned image data. The acquired image data is RGB image data. Each pixel has three pixel values, that is, R, G, and B pixel values. This embodiment will be described assuming that each of R, G, and B is 8-bit data which takes an integer value of 0 to 255.

Figure 6A:
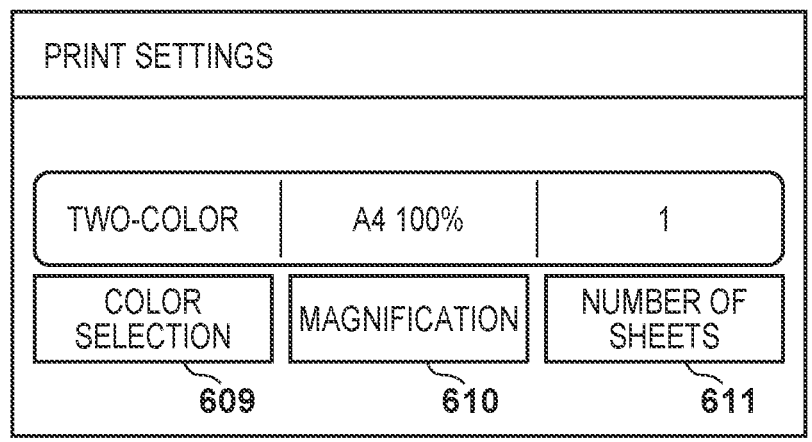
FIGS. 6A to 6C are views showing an example of an operation panel when performing two-color print settings.
Figure 6B:
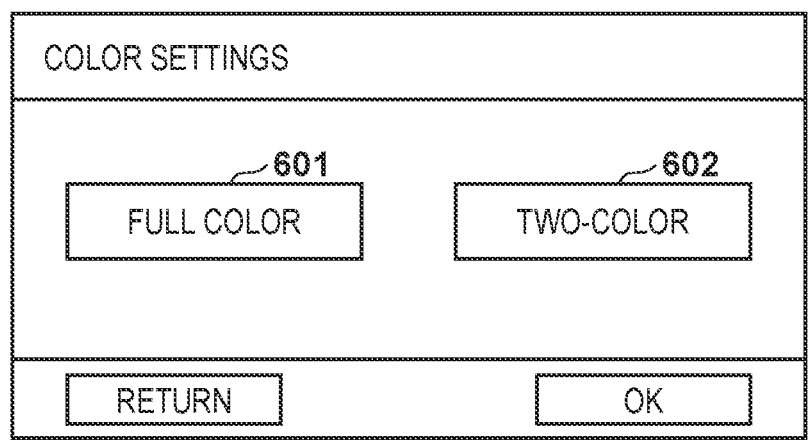
Figure 6C:
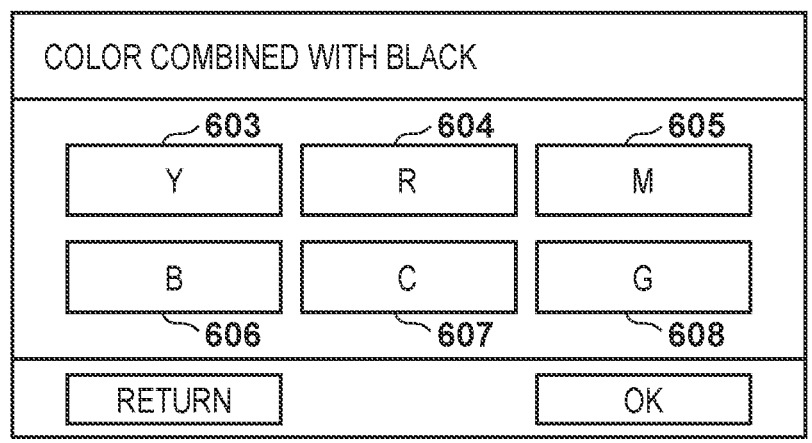

Next, in step S202, the image data acquisition unit 101 acquires setting values transmitted from the UI 111. The setting values of the UI 111 are values set based on designation from the user via the UI 111. FIGS. 6A to 6C show an example of the UI 111 displayed on an operation unit. In FIG. 6A, buttons 609, 610, and 611 for performing transition to the UI to set the color selection, magnification, and the number of sheets at the time of printing are selectably displayed. These buttons can be selected when the user directly operates the touch panel liquid crystal display portion of the operation unit. Alternatively, the setting values may be selected by operating hardware keys separately arranged. FIG. 6B is a screen for setting the number of colors which changes upon pressing the color selection button 609 in FIG. 6A. If full color printing using the CMYK color materials is to be performed, the UI 111 transmits the setting values of a full color button 601 pressed by the user. On the other hand, if a two-color button 602 is pressed, the UI 111 transitions the screen to the setting screen for setting the user's designated color in FIG. 6C. Processing to be performed when the two-color button 602 has been selected in FIG. 6B will be described below.

In a UI menu shown in FIG. 6C, a color (a designated color) combined with black in two-color printing can be selected. For example, any color can be set from the colors, that is, Y (603), R (604), M (605), B (606), C (607), and G (608). Note that the setting values may be designated by the user in advance in accordance with the user inputs via the above setting screens, or may be selected by the user at the time of printing. If the setting values are designated by the user in advance, control may be performed such that the setting values are conformed to the user at the time of printing. Note that any chromatic color except the above colors can be selected. If an OK button is operated while any one of the buttons 603 to 608 is selected, the setting of the designated color is confirmed. If a return button is operated, the previous screen is restored without setting the designated color of the selected button.

Subsequently, in step S203, the show-through determination unit 102 performs show-through pixel determination for each pixel of the RGB image data acquired in step S201. Based on the show-through determination result, the show-through determination unit 102 assigns a flag (show-through determination flag) indicating whether each pixel of the RGB image data is a show-through pixel. For example, if the pixel is the show-through pixel, the show-through determination flag holds 1; otherwise, the flag holds 0. Note that the show-through determination flag is assigned, and the value indicating whether the pixel is the show-through pixel is set at 1 or 0 in this embodiment, but any form may be employed if a pixel is determined as a show-through pixel or not.

In addition, according to this embodiment, it is determined using the RGB value of each pixel of image data and a variance value whether the pixel is the show-through pixel. The variance value represents the degree of variation of the RGB values of arbitrary pixel (target pixel) and surrounding pixels. Normally, if a given pixel is compared with another pixel and their colors are different from each other, these two pixels have different RGB values and different variance values. To the contrary, if the colors of the two pixels are the same, the RGB values have the same value and the variance values also have the same value. However, in a case of a given pixel whose color is changed from the original color due to the show-through, if the color of the given pixel is compared with the pixel having the original color, these pixels have a feature such that the RGB values are different from each other, but the variance values are the same. By using this feature, it is determined whether the given pixel is a show-through pixel. Details of the show-through pixel determination will be described later.

Next, in step S204, the color conversion unit 105 acquires one pixel from the image data acquired in step S201. In addition, the color conversion unit 105 acquires the show-through pixel determination flag information linked to the pixel and assigned in step S203. Subsequently, in step S205, based on the show-through determination flag value assigned in step S203, the color conversion unit 105 determines whether the pixel acquired in step S204 is the show-through pixel. If YES in step S205, the flow advances to step S206; otherwise, the flow advances to step S207.

In step S206, the color conversion unit 105 executes two-color conversion processing corresponding for show-through pixels, and the process advances to step S208. Details of the two-color conversion processing for show-through pixels will be described later. On the other hand, in step S207, the color conversion unit 105 executes the normal two-color conversion processing, and the process advances to step S208. Details of the normal two-color conversion processing will be described later.

Next, in step S208, the color conversion unit 105 determines whether all the pixels of the RGB image data acquired in step S201 have been processed. To determine whether all the pixels have been processed, flags indicating the completion of the processing may be assigned to the respective pixels, and it is determined that the flags of the pixels indicate completion of the processing. Alternatively, the number of all pixels may be held at the time of image data acquisition, and it may be determined whether processing is repeated for all the pixels. If all the pixels are not completely processed, the flow returns to step S204.

If it is determined in step S208 that all the pixels have been processed, in step S209 the color conversion unit 105 outputs, to the gamma correction unit 106, the pixel data converted into the CMYK value indicating that all the pixels are set to the user's designated color or the achromatic color, thereby terminating the processing.

<Show-Through Pixel Determination>

The details of the show-through pixel determination processing in step S203 of FIG. 2 will now be described with reference to FIG. 3. The show-through determination unit 102 performs the processing of each step in FIG. 3. The processing to be described below is implemented such that the CPU 114 reads out, for example, programs stored in the storage device 112 connected to the image processing apparatus 100 to the RAM 113 and executes them.

Figure 5:
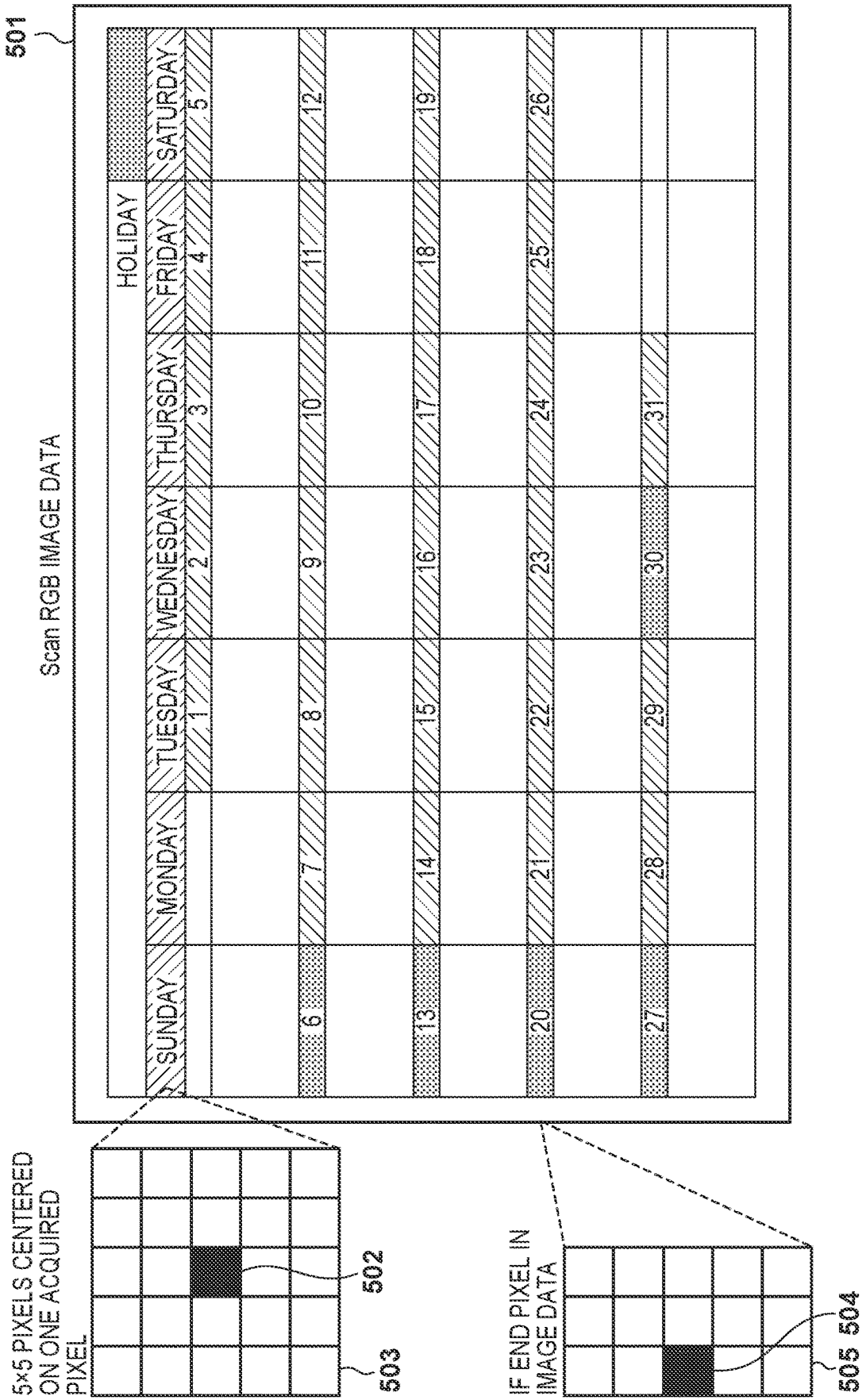
FIG. 5 shows images of a pixel group acquired from image data.

First, in step S301, the show-through determination unit 102 acquires one pixel (the target pixel) from the RGB image data acquired in step S201. Subsequently, in step S302, the show-through determination unit 102 acquires, from the RGB image data, 5×5 pixels (25 pixels including the target pixel) centered on the pixel acquired in step S301. For example, as shown in FIG. 5, 24 surrounding pixels 503 centered on a target pixel 502 acquired from RGB image data 501 are acquired. If the target pixel is an end pixel in the image data, the RGB values of the absent pixels are handled as 0. For example, if the target pixel is the left end pixel in the image data, as indicated by 504 in FIG. 5, no pixels are present to the left of the target pixel. The 2×5 absent pixels are handled such that their RGB values are set as 0. Note that in this embodiment, the number of pixels to be acquired in this embodiment is 25 (=5×5), but the number of pixels is not limited to this. The number of pixels to be acquired may be changed in accordance with the size of image data.

Next, in step S303, the show-through determination unit 102 calculates (acquires) the variance values of the target pixel from the target pixel and surrounding pixels acquired in steps S301 and S302. The variance values of the target pixel are calculated for R, G, and B, respectively. The variance values are calculated by:

$$\sigma r[n] = \sqrt{\sum_{i=1}^{N} \frac{(xri - \mu r)^2}{N}} \quad (1)$$

$$\sigma g[n] = \sqrt{\sum_{i=1}^{N} \frac{(xgi - \mu g)^2}{N}}$$

$$\sigma b[n] = \sqrt{\sum_{i=1}^{N} \frac{(xbi - \mu b)^2}{N}}$$

wherein σr[n] indicates the R variance value of the nth pixel of the image data, xri indicates the R pixel value (luminance value) of the ith pixel in the 5×5 pixels, μr indicates the R pixel average value of the 5×5 pixels, and N indicates the total number of pixels (25). Similarly, σg[n] indicates the G variance value of the nth pixel of the image data, and σb[n] indicates the B variance value of the nth pixel of the image data. xgi indicates the G pixel value of the ith pixel, and xbi indicates the B pixel value of the ith pixel. μg indicates the G pixel average value, and μb indicates the B pixel average value. Σ indicates the sum operator.

Next, in step S304, the show-through determination unit 102 adds the pixel values having the same variance value to R, G, and B based on the variance values calculated in step S303 as follows:

$$Tr[\sigma r[n]] = Tr[\sigma r[n]] + Pr$$

$$Tg[\sigma g[n]] = Tg[\sigma g[n]] + Pg$$

$$Tb[\sigma b[n]] = Tb[\sigma b[n]] + Pb \quad (2)$$

where Tr represents the matrix which holds the sum of the R pixel values for each variance value, and the initial value of the matrix is 0, and Pr represents the R pixel value of the target pixel. Similarly, Tg and Tb represent the matrices which hold the sums of the G and B pixel values for the respective variance values, and the initial values of the matrices are 0. Pg and Pb represent the G and B pixel values of the target pixel. In addition, for each variance value and for each of R, G, and B, the number of pixels is counted for the corresponding pixels as follows:

$$Cr[\sigma r[n]] = Cr[\sigma r[n]] + 1$$

$$Cg[\sigma g[n]] = Cg[\sigma g[n]] + 1$$

$$Cb[\sigma b[n]] = Cb[\sigma b[n]] + 1 \quad (3)$$

where Cr represents the matrix which hold the sum of the number of R pixels for each variance value, and the initial value of the matrix is 0. Similarly, Cg and Cb represent matrices which hold the sums of the numbers of G and B pixels for the respective variance values, and the initial values of the matrices are 0.

Next in step S305, the show-through determination unit 102 determines whether all the pixels of the RGB image data acquired in step S301 have been processed. To determine whether all the pixels have been processed, flags indicating the completion of the processing may be assigned to the respective pixels, and it is determined that the flags of the pixels indicate completion of the processing. Alternatively, the number of all pixels may be held at the time of image data acquisition, and it may be determined whether processing is repeated for all the pixels. If all the pixels are not completely processed, the flow returns to step S301. If it is determined that all the pixels have been processed, the process advances to step S306.

In step S306, the show-through determination unit 102 calculates the average pixel values for the respective R, G, and B variance values from the sum of the pixel values for the respective variance values calculated in step S304 and the sum of the numbers of pixels. The average pixel values are calculated by:

$$Aver[\sigma r[n]]=Tr[\sigma r[n]]/Cr[\sigma r[n]]$$

$$Aveg[\sigma g[n]]=Tg[\sigma g[n]]/Cg[\sigma g[n]]$$

$$Aveb[\sigma b[n]]=Tb[\sigma b[n]]/Cb[\sigma b[n]] \quad (4)$$

wherein Aver is the R average pixel value for each variance value, Aveg is the G average pixel value for each variance value, and Aveb is the B average pixel value for each variance value.

Next, in step S307, the show-through determination unit 102 acquires one pixel (the target pixel) from the RGB image data acquired in step S201. Subsequently, in step S308, the show-through determination unit 102 compares the pixel values of the target pixel acquired in step S307 with the average pixel values corresponding to the variance values of the target pixel calculated in step S306 to determine whether each pixel value of the target pixel is smaller than the corresponding average pixel value. The determination is performed for each of R, G, and B. For example, assume that the R pixel value of the 10th pixel counted from the start of the image data is 200, the variance value calculated in step S303 is σr[10]=20, and the R average pixel value for each variance value calculated in step S306 is Aver[10]=210. If n is defined as the nth pixel, and the R pixel value of the nth pixel is expressed as Zr[n], since Zr[10]<Aver[20], the 10th pixel as the target pixel has a pixel value smaller than the average pixel value. In this case, the flow advances to step S309; otherwise, the process advances to step S310.

If it is determined in step S308 that all the R, G, and B pixel values of the target pixel are smaller than the corresponding average pixel values, in step S309 the show-through determination unit 102 assigns and links, to the image data of the target pixel, information indicating whether the show-through has occurred. For example, the value of the show-through pixel flag is set to 1. Note that since the brightness often changes in the show-through, all the R, G, and B pixel values are normally smaller than the corresponding average pixel values. For this reason, if it is determined that all the R, G, and B pixel values are smaller than the corresponding average pixel values, no problem is posed. However, for example, there is a case in which while the RGB signals are acquired at the time of reading of the image, only the G signal is finally used to generate an image. Accordingly, a combination of the R, G, and B signals used for determination may be changed based on differences in the arrangement of the scanner and the image processing sequence such that a show-through occurs in only the G signal (that is, the signal value of the G signal is smaller than the corresponding average value). After that, in step S311, the show-through determination unit 102 calculates the absolute value of the difference between the pixel value of the target pixel and the corresponding average pixel value, and records and holds the absolute value in the storage device 112. The process advances to step S312. The differences are calculated by:

$$Dr[n]=abs(Zr[n]-Aver[\sigma r[n]])$$

$$Dg[n]=abs(Zg[n]-Aveg[\sigma g[n]])$$

$$Db[n]=abs(Zb[n]-Aveb[\sigma b[n]]) \quad (5)$$

wherein Dr represents the absolute value (abs( )) of the R difference, and Zr represents the R pixel value. In addition, n represents the nth pixel. Similarly, Dg and Db represent the absolute values of the G and B differences, respectively. Zg and Zb represent the G and B pixel values, respectively.

On the other hand, if it is determined in step S308 that the pixel values of the target pixel are equal to or larger than the corresponding average pixel values, in step S310 the show-through determination unit 102 sets the value of the show-through pixel flag corresponding to the target pixel to 0, and the process advances to step S312.

In step S312, the show-through determination unit 102 determines whether all the pixels of the RGB image data acquired in step S301 have been processed. To determine whether all the pixels have been processed, flags indicating the completion of the processing may be assigned to the respective pixels, and it is determined that the flags of the pixels indicate completion of the processing. Alternatively, the number of all pixels may be held at the time of image data acquisition, and it may be determined whether processing is repeated for all the pixels. If all the pixels are not completely processed, the flow returns to step S307. If it is determined that all the pixels have been processed, processing ends. Note that the show-through pixel flag generated in this processing is stored and held in the storage device 112.

<Show-Through Two-Color Conversion Processing>

Details of the show-through two-color conversion processing in step S206 of FIG. 2 will be described with reference to FIG. 4. The color conversion unit (the first color conversion unit) 105 performs the processing of each step in FIG. 4. The processing to be described below is implemented such that the CPU 114 reads out, for example, programs stored in the storage device 112 connected to the image processing apparatus 100 to the RAM 113 and executes them.

Figure 2:
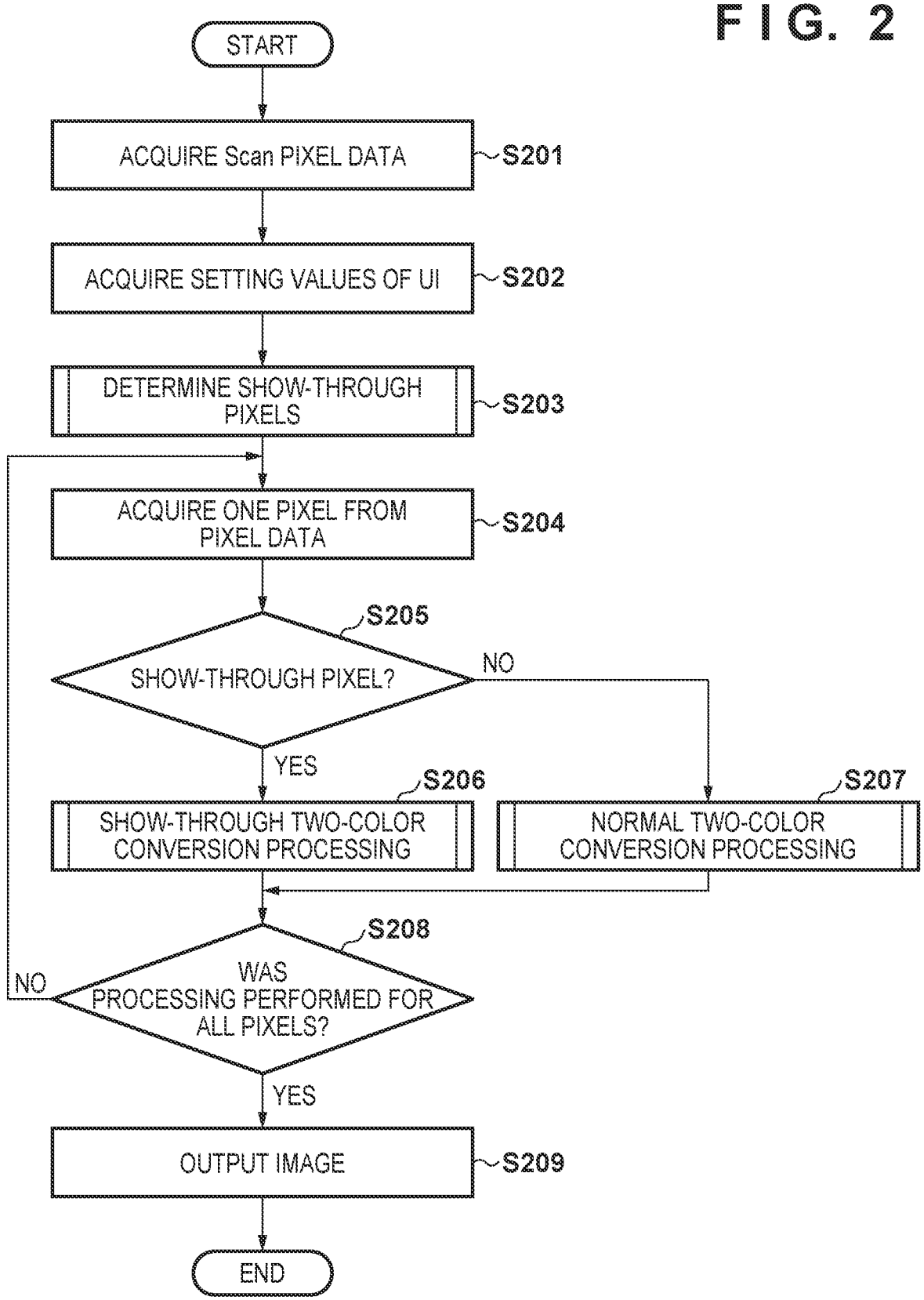
FIG. 2 is a flowchart of two-color conversion according to the embodiment.
Figure 3:
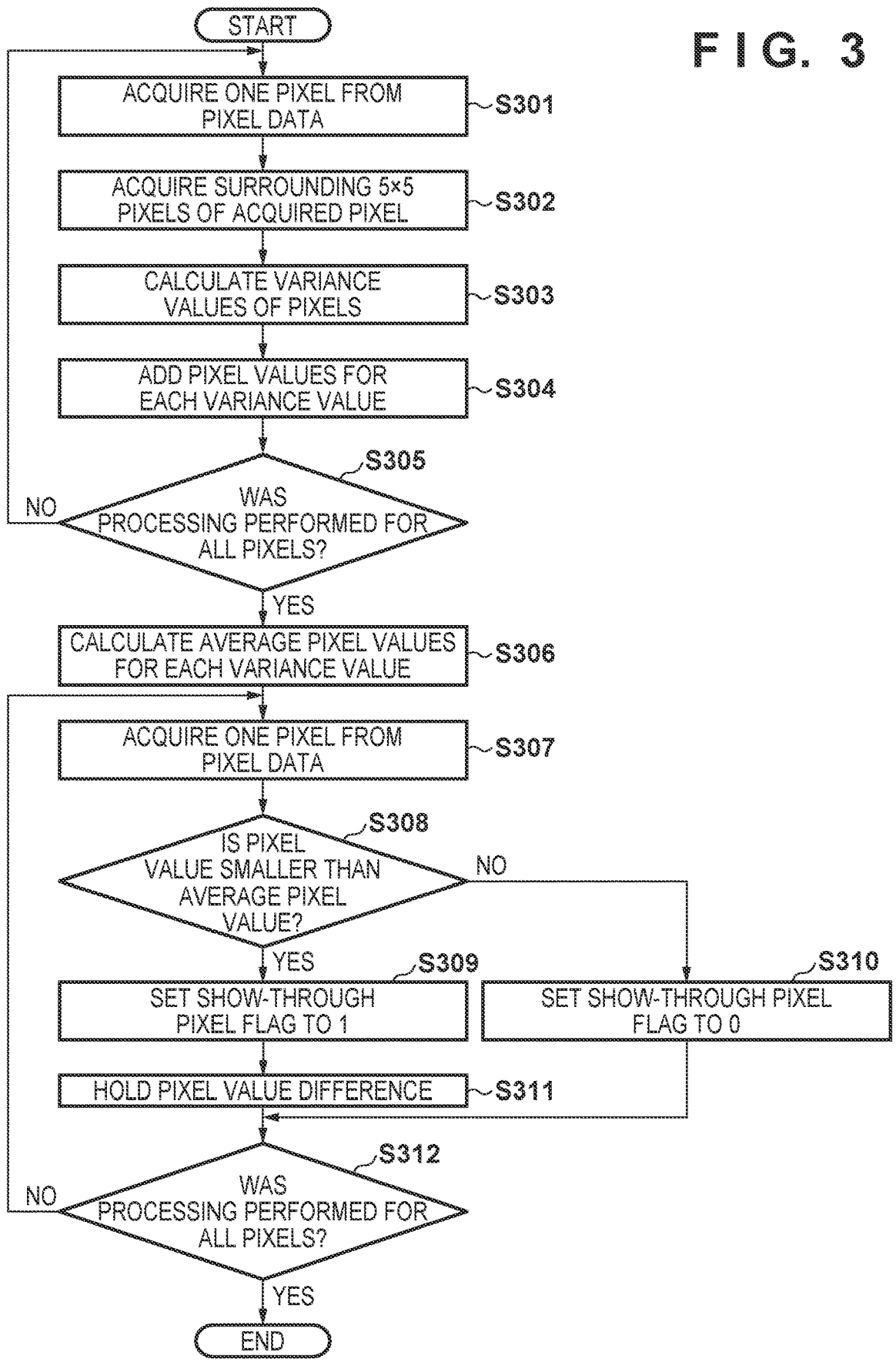
FIG. 3 is a flowchart of show-through pixel determination according to the embodiment.

First, in step S401, the color conversion unit 105 corrects the pixel values of the pixel acquired in step S204 of FIG. 2 using the difference value held in the storage device 112 in step S311 of FIG. 3. The pixel values are corrected by:

$$M=\text{Min}(Dr[n],Dg[n],Db[n])$$

$$Xmr[n]=Zr[n]+M$$

$$Xmg[n]=Zg[n]+M$$

$$Xmb[n]=Zb[n]+M \quad (6)$$

wherein M has the smallest value (Min represents the function for outputting the smallest value) of Dr, Dg, and Db held in step S311. Xmr represents the R corrected pixel value, and n represents the nth pixel. Similarly, Xmg and Xmb are G and B corrected pixel values, respectively.

Next, in step S402, the color conversion unit 105 converts the color space of the pixel whose pixel values are corrected in step S401. In this conversion, the color space is converted into the L*a*b* space once and further converted into the LCH space. A method of converting the color space into the L*a*b* space will be described first. The pixel conversion into the L*a*b* values is performed by an interpolation operation using a conversion table from the RGB space prestored in the storage device 112 into the L*a*b* space. The conversion table from the RGB space to the L*a*b* space defines a cubic body of the three-dimensional color space defined by the RGB signals. As shown in FIG. 8, coordinates in a cubic body 801 of the three-dimensional color space can be determined in accordance with the values of 8-bit RGB data (0 to 255). Eight vertices of the cubic body indicate R, G, B, Y, M, C, K, and W. The conversion table from the RGB space to the L*a*b* space is defined by the RGB values of the input data, has, for example, 9×9×9 matrix points, and stores the L*a*b* values corresponding to these matrix points as the table data. For example, in a table 802 in FIG. 8, the L*a*b* values (44.01, 61.37, 39.68) are stored as the table data corresponding to the RGB values (255, 0, 0).

The interpolation operation is performed such that when a value which is not defined in an operation table is input, interpolation is performed using a value defined in an operation table close to the input value. Tetrahedron interpolation is available as an interpolation operation method. In the tetrahedron interpolation, an interpolation operation is performed using values defined in four operation tables close to the input value. In this processing, the tetrahedron interpolation operation is performed using an input as a pixel RGB value and an operation table as the RGB→L*a*b* conversion table, thereby obtaining L*a*b* values of each pixel. The tetrahedron interpolation is used for conversion in this embodiment, but the interpolation method does not limit the present invention. Any method such as conversion using an arithmetic formula may be used if it can convert the RGB space into the L*a*b* space.

Subsequently, the RGB image data converted into the L*a*b* space are converted into the LCH space. Since L in L*a*b* is identical to L of LCH and can be used directly. The value of C (saturation) can be obtained by:

$$C=\text{sqrt}(a*^2+b*^2) \quad (7)$$

where sqrt represents the square root calculation, and ^ represents the exponentiation calculation. The value of H (hue) can be calculated by:

$$H=\arctan(b*/a*)\times(180/PI)$$

$$H=H \text{ (for } H\geq 0)$$

$$H=H+360 \text{ (for } H<0) \quad (8)$$

where arctan represents the arc tangent calculation, and PI represents a circle ratio π. H can be expressed in an angular range of 0° to 360°.

Next, in step S403, the color conversion unit 105 determines, using the value of C (saturation) of the pixel having undergone color space conversion in step S402, whether the pixel is a chromatic or achromatic color, thereby generating determination result information. The determination to determine whether the pixel is a chromatic or achromatic color is performed by comparing a threshold held in the storage device 112 in advance with the acquired C (saturation) of the pixel. For example, if the threshold is given as 20, a pixel whose C (saturation) is less than 20 is determined as an achromatic color; otherwise, the pixel is determined as a chromatic color. In this embodiment, the threshold is given as the value held in advance, but the threshold value may be dynamically set in accordance with an input image arrangement or may be input by a user using a UI. In this embodiment, the determination result is held in the storage device 112 in the form of a flag. A chromatic/achromatic determination flag is generated in accordance with the determination result. If the pixel is determined as the achromatic color, the chromatic/achromatic determination flag is set to 0. If the pixel is determined as the chromatic color, the chromatic/achromatic determination flag is set to 1. However, any form may be employed if chromatic or achromatic color information can be held.

Subsequently, in step S404, the color conversion unit 105 acquires a hue range value using the designated color information among the UI setting values acquired in step S202. The hue range value is a value representing a hue range of each color of C, M, Y, R, G, and B. For example, as shown in FIG. 7, a color having a hue range between 701 and 702 in FIG. 7 is expressed as R, and a color having a hue range between 702 and 703 is expressed as Y. The hue range values correspond to C, M, Y, R, G, and B, respectively and are stored in the storage device 112 in advance as the lower and upper limit values in the table form, as shown in FIG. 9.

For example, if the hue range value is R in FIG. 7, the lower limit value of the hue range is a hue value (10 as the lower limit value of R in FIG. 9) corresponding to 701, and the upper limit value of the hue range is a hue value (80 as the upper limit value of R in FIG. 9) corresponding to 702. For this reason, if the user's designated color is R, as the hue range values, the hue range lower limit value of 10° and the hue range upper limit value of 80° are obtained from the storage device 112. Note that since the hue is expressed as an angle, a hue range including the a*-axis of 0° uses two ranges, as shown in M in FIG. 7. While the lower limit value of the hue is given as 701 (10 as the lower limit value of M in FIG. 9) and the upper limit value of the hue is given as 706 (310 as the upper limit value of M in FIG. 9), the hue ranges are defined between [0°] and [10°] as the lower limit value 701 of the hue and between the hue upper limit value 706 [310°] and [360°]. Although the hue range value according to this embodiment is a value held in advance, the hue range value may be dynamically set in accordance with the characteristic of the image processing apparatus or may be selected by a user from a UI.

Next, in step S405, the color conversion unit 105 determines using the value of H (hue) and the hue range values acquired in step S404 among the pixel values of the pixel whose color space is converted in step S402 whether the pixel falls within a predetermined hue range and generates determination result information. For example, if the user's designated color is R, since the hue range lower limit value is 10° and the hue range upper limit value is 80°, the color conversion unit 105 determines the pixel falls within the hue range if the H (hue) value is 10° or more and less than 80°; otherwise, the color conversion unit 105 determines that the pixel falls outside the hue range. In this embodiment, the determination result is held in the storage device 112 in the form of a flag. A hue range inside/outside determination flag is generated in accordance with the determination result. If the pixel falls within the hue range, the hue range inside/outside determination flag is set to 1; otherwise, the flag is set to 0. However, any form may be employed if the hue range inside/outside information can be held.

Next, in step S406, the color conversion unit 105 determines whether the pixel is converted into the user's designated color or the achromatic color. The determination to determine whether the pixel is converted into the user's designated color or the achromatic color is performed by a combination of pieces of information (flags) generated in steps S403 and S405. FIG. 10 shows a case whether the pixel is converted into the user's designated color or the achromatic color by a combination of values of the flags. The chromatic/achromatic determination flag generated in step S403 and held in the storage device 112 corresponds to 1001. The hue range inside/outside determination flag generated in step S405 and held in the storage device 112 corresponds to 1002. A table (determination result output table) which receives the values of the respective flags and outputs a conversion color 1003 in FIG. 10 is held in the storage device 112 in advance. As for the conversion color 1003, for example, the designated color is associated with 1, and the achromatic color may be associated with 0, and the corresponding value may be set as the output value. The color conversion unit 105 acquires the determination result output table from the storage device 112. Using this table, the values of the chromatic/achromatic determination flag and the hue range inside/outside determination flag are input, and the value (for example 1 or 0) corresponding to the designated color or the achromatic color is output.

Next, if it is determined in step S406 that the pixel is converted into the user's designated color, in step S407 the color conversion unit 105 converts the RGB values (the RGB values before conversion into the LCH space) into the user's designated color and ends the processing. As the sequence of conversion to the user's designated color, the color conversion unit 105 converts the RGB values of the pixel into the CMYK values using the full-color color conversion table held in the storage device 112 by the two-color conversion table holding unit 104. Subsequently, the color conversion unit 105 converts the full-color CMYK values into the CMYK values constituting the user's designated color using an arithmetic formula. The conversion into the CMYK values using the full-color conversion table is performed by tetrahedron interpolation using the full-color conversion table from the RGB space to the CMYK space as in the conversion from the RGB space to the L*a*b* space in step S402.

The full-color conversion table defines the cubic body of the three-dimensional color space defined by the RGB signals. As shown in FIG. 8, coordinates in the cubic body of the three-dimensional color space can be determined in accordance with the values of the RBG 8-bit data. The eight vertices of the cubic body indicate R, G, B, Y, M, C, K, and W. The color conversion table has, for example, 16×16×16 matrix points defined by the RGB values of the input data. In the color conversion table, the CMYK values corresponding to these matrix points are stored as the table data. For example, as indicated by 803 in FIG. 8, the CMYK values (0, 255, 255, 0) are stored as the table data corresponding to the RGB values (255, 0, 0). The tetrahedron interpolation operation method using the full-color conversion table is similar to the conversion from the RGB space to the L*a*b* space in step S402, and a description will be omitted.

Subsequently, the color conversion unit 105 converts the full-color CMYK values calculated by the tetrahedron interpolation operation using the full-color conversion table into the CMYK values constituting the user's designated color using the arithmetic formula. The operation is performed using the following matrices:

If R is set as the user's designated color, $$\begin{pmatrix} C \\ M \\ Y \\ K \end{pmatrix} = \begin{pmatrix} 0 & 0 & 0 & 0 \\ 0.33 & 0.33 & 0.33 & 0 \\ 0.33 & 0.33 & 0.33 & 0 \\ 0 & 0 & 0 & 1 \end{pmatrix} * \begin{pmatrix} C \\ M \\ Y \\ K \end{pmatrix} \quad (9)$$

If G is set as the user's designated color, $$\begin{pmatrix} C \\ M \\ Y \\ K \end{pmatrix} = \begin{pmatrix} 0.33 & 0.33 & 0.33 & 0 \\ 0 & 0 & 0 & 0 \\ 0.33 & 0.33 & 0.33 & 0 \\ 0 & 0 & 0 & 1 \end{pmatrix} * \begin{pmatrix} C \\ M \\ Y \\ K \end{pmatrix} \quad (10)$$

If B is set as the user's designated color, $$\begin{pmatrix} C \\ M \\ Y \\ K \end{pmatrix} = \begin{pmatrix} 0.33 & 0.33 & 0.33 & 0 \\ 0.33 & 0.33 & 0.33 & 0 \\ 0 & 0 & 0 & 0 \\ 0 & 0 & 0 & 1 \end{pmatrix} * \begin{pmatrix} C \\ M \\ Y \\ K \end{pmatrix} \quad (11)$$

If C is set as the user's designated color, $$\begin{pmatrix} C \\ M \\ Y \\ K \end{pmatrix} = \begin{pmatrix} 0.33 & 0.33 & 0.33 & 0 \\ 0 & 0 & 0 & 0 \\ 0 & 0 & 0 & 0 \\ 0 & 0 & 0 & 1 \end{pmatrix} * \begin{pmatrix} C \\ M \\ Y \\ K \end{pmatrix} \quad (12)$$

If M is set as the user's designated color, $$\begin{pmatrix} C \\ M \\ Y \\ K \end{pmatrix} = \begin{pmatrix} 0 & 0 & 0 & 0 \\ 0.33 & 0.33 & 0.33 & 0 \\ 0 & 0 & 0 & 0 \\ 0 & 0 & 0 & 1 \end{pmatrix} * \begin{pmatrix} C \\ M \\ Y \\ K \end{pmatrix} \quad (13)$$

If Y is set as the user's designated color, $$\begin{pmatrix} C \\ M \\ Y \\ K \end{pmatrix} = \begin{pmatrix} 0 & 0 & 0 & 0 \\ 0 & 0 & 0 & 0 \\ 0.33 & 0.33 & 0.33 & 0 \\ 0 & 0 & 0 & 1 \end{pmatrix} * \begin{pmatrix} C \\ M \\ Y \\ K \end{pmatrix} \quad (14)$$

In this embodiment, the RGB values are converted into the CMYK values constituting the user's designated color using the color conversion table and the matrix operation. However, any method may be used if the RGB values are converted into the CMYK values of the user's designated color.

Next, if it is determined in step S406 that the pixel is converted into the achromatic color, in step S408 the color conversion unit 105 converts the RGB values (RGB values before conversion into the LCH space) of the pixel and ends the processing. As the sequence of conversion to the achromatic color, the color conversion unit 105 converts the RGB values of the pixel into the CMYK values using the full-color conversion table held in the storage device 112 by the two-color conversion table holding unit 104 as in step S407. Subsequently, the full-color CMYK values are converted into the CMYK values constituting the achromatic color using the arithmetic formula. Conversion to the CMYK values using the full-color conversion table is similar to step S407, and a description thereof will be omitted.

Subsequently, the full-color CMYK values calculated by the tetrahedron interpolation operation using the full-color conversion table are converted into the CMYK values constituting the user's designated color using the arithmetic formula. The operation is performed using the following matrix:

$$\begin{pmatrix} C \\ M \\ Y \\ K \end{pmatrix} = \begin{pmatrix} 0 & 0 & 0 & 0 \\ 0 & 0 & 0 & 0 \\ 0 & 0 & 0 & 0 \\ 0.25 & 0.25 & 0.25 & 0.25 \end{pmatrix} * \begin{pmatrix} C \\ M \\ Y \\ K \end{pmatrix} \quad (15)$$

In this embodiment, the RGB values are converted into the CMYK values constituting the achromatic color using the color conversion table and the arithmetic formula. However, any method can be used if the RGB values are converted into the CMYK values of the achromatic color.

<Normal Two-Color Conversion Processing>

Next, the normal two-color conversion in step S207 of FIG. 2 will be described below. In the normal two-color conversion processing (processing by the second color conversion unit), among the processing in FIG. 4 which is the detailed processing of the show-through two-color conversion in step S206, processes in steps S402 to S408 are performed without performing step S401. That is, since the show-through is absent, the pixel value corresponding to the show-through degree need not be performed, and only color conversion processing is performed. The processing has been described above and will be omitted.

The full-color conversion table and the matrices have been used in color conversion to the user's designated color or the achromatic color. However, tables for directly converting the RGB values into the user's designated color and the achromatic color may be created in advance, and color conversion may be performed for the pixels to be converted into the user's designated color and the achromatic color by switching the tables.

As has been described above, the image processing apparatus according to this embodiment determines whether the show-through has occurred in each pixel of the read original image data. If it is determined that the show-through has occurred, the show-through of the pixel is corrected, and two-color conversion processing for converting the pixel into the user's designated color or the achromatic color is executed for the corrected image data. On the other hand, if it is determined that the show-through has not occurred, the two-color conversion processing is executed for the image data read from the pixel of the original. Accordingly, even if an original in which the show-through occurs is copied in the two-color copy mode, the determination result for converting the pixel into the user's designated color or the achromatic color does not change regardless of the presence/absence of the show-through. For this reason, even in a show-through portion, the pixel to be converted into the user's designated color can be converted into the user's designated color as in the case in which no show-through is absent, thereby converting the pixel to be converted into the achromatic color into the achromatic color. As described above, according to this embodiment, in performing the two-color copy of a color original in which a show-through occurs, the show-through influence can be suitably reduced in the conversion processing to the achromatic color or the user's designated color.

Second Embodiment

The second embodiment of the present invention will now be described below. In the first embodiment, the two-color conversion is performed for the show-through portion after the show-through pixel is corrected based on the pixel values (RGB values: luminance values). Many show-through cases are caused by changes in brightness, and the problem can be solved by the method of the first embodiment. However, if the color of a reverse image is dark, and particularly the original is thin paper, changes in color type (hue or saturation) may also occur. In this embodiment, a method of more effectively solving the problem will be described even if changes in color type also occur due to the show-through.

Since the arrangement of the image forming apparatus according to the second embodiment is similar to that of the first embodiment, and a description thereof will be omitted. Of the processing sequence in FIG. 2, only the show-through pixel determination in step S203 and the show-through two-color conversion in step S206 are different from those of the first embodiment, and the two processes will be described in the second embodiment.

<Show-Through Pixel Determination>

Details of the show-through pixel determination in step S203 of this embodiment will be described using FIG. 11. As in the first embodiment, a show-through determination unit 102 performs all the processes of the steps in FIG. 11. The processing to be described below is implemented such that a CPU 114 reads out, for example, programs stored in a storage device 112 connected to an image processing apparatus 100 to a RAM 113 and executes them. The processed in steps S1101 to S1110 and S1115 are the same as the processes in steps S301 to S310 and S312 in FIG. 3, and a description thereof will be omitted. Note that in step S1108, it is desirable to determine that the show-through has occurred in a pixel if all the HSV values, that is, the values of the hue, saturation, and brightness are smaller than the average values, respectively.

In step S1111, the show-through determination unit 102 converts the RGB values of the pixel obtained in step S1107 into the HSV values. H, S, and V of the HSV represent the hue, the saturation, and the brightness, respectively. In this embodiment, H is an integer value falling within the range of 0 to 360, and each of the S and V is an integer value falling within the range of 0 to 255. Conversion from RGB to HSV is performed by:

$$\text{MAX}rgb = \text{Max}(Zr[n], Zg[n], Zb[n]) \quad (16)$$

$$\text{MIN}rgb = \text{Min}(Zr[n], Zg[n], Zb[n])$$

$$H[n] =$$

$$60 \times ((Zg[n] - Zb[n])/(\text{MAX}rgb - \text{MIN}rgb))(\text{MAX}rgb = Zr[n])$$

$$H[n] = 60 \times ((Zb[n] - Zr[n])/(\text{MAX}rgb - \text{MIN}rgb)) +$$

$$120(\text{MAX}rgb = Zg[n])$$

$$H[n] = 60 \times ((Zg[n] - Zb[n])/(\text{MAX}rgb - \text{MIN}rgb)) +$$

$$240(\text{MAX}rgb = Zb[n])$$

$$H[n] = 0 \quad (Zr[n] = Zg[n] = Zb[n])$$

$$S[n] = (\text{MAX}rgb - \text{MIN}rgb)/\text{MAX}rgb$$

$$V[n] = \text{MAX}rgb$$

wherein MAX rgb represents the largest value of Zr, Zg, and Zb, and MIN rgb represents the smallest value of Zr, Zg, and Zb. As in the first embodiment, Zr, Zg, and Zb represent the pixel values of R, G, and B, respectively. n represents the nth pixel.

Subsequently, in step S1112, the show-through determination unit 102 adds H, S, and V having the same variance value and calculated in step S1111 based on the variance values calculated in step S1103. The additions are performed by:

$$Th[\sigma r[n]] = Th[\sigma r[n]] + H[n]$$

$$Ts[\sigma g[n]] = Ts[\sigma g[n]] + S[n]$$

$$Tv[\sigma b[n]] = Tv[\sigma b[n]] + V[n] \quad (17)$$

wherein Th represents the matrix which holds the sum of the pixel values of H for each variance value, and the initial value of Th is 0. Similarly, Ts and Tv are matrices which hold the sums of the pixel values for the respective variance values of S and V, respectively, and the initial values of Ts and Tv are 0. The ordinal number of a pixel is counted for each variance value, each H value, each S value, and each V value. The counting operations are given by:

$$Ch[\sigma r[n]] = Ch[\sigma r[n]] + 1$$

$$Cs[\sigma g[n]] = Cs[\sigma g[n]] + 1$$

$$Cv[\sigma b[n]] = Cv[\sigma b[n]] + 1 \quad (18)$$

wherein Ch represents the matrix which holds the sum of the number of pixels of H for each variance value, and the initial value of Ch is 0. Similarly, Cs and Cv are matrices which hold the sums of the numbers of pixels for the respective variable values of S and V, respectively, and the initial values of Cs and Cv are 0.

Next in step S1113, the show-through determination unit 102 calculates the average pixel values for the respective variance values for H, S, and V from the sums of the values of H, S, and V for the respective variance values calculated in step S1112 and the sums of the numbers of pixels. The average pixel values are calculated by:

$$Aveh[\sigma r[n]] = Th[\sigma r[n]] / Ch[\sigma r[n]]$$

$$Aves[\sigma g[n]] = Ts[\sigma g[n]] / Cs[\sigma g[n]]$$

$$Avev[\sigma b[n]] = Tv[\sigma b[n]] / Cv[\sigma b[n]] \quad (19)$$

wherein Aveh represents the average pixel value of H for each variance value, Aves represent the average pixel value of S for each variance value, and Avev represents the pixel value of V for each variance value.

In step S1114, the show-through determination unit 102 calculates the absolute values of the differences between the HSV values of the target pixel and the corresponding average HSV values and holds them. The differences are calculated by:

$$Dh[n] = abs(H[n] - Aveh[\sigma r[n]])$$

$$Ds[n] = abs(S[n] - Aves[\sigma g[n]])$$

$$Dv[n] = abs(V[n] - Avev[\sigma b[n]]) \quad (20)$$

wherein Dh represents the absolute value of the difference of H, and n represents the nth pixel. Similarly, Ds and Dv represent the absolute values of the differences of S and V, respectively.

<Show-Though Two-Color Conversion Processing>

Figure 12:
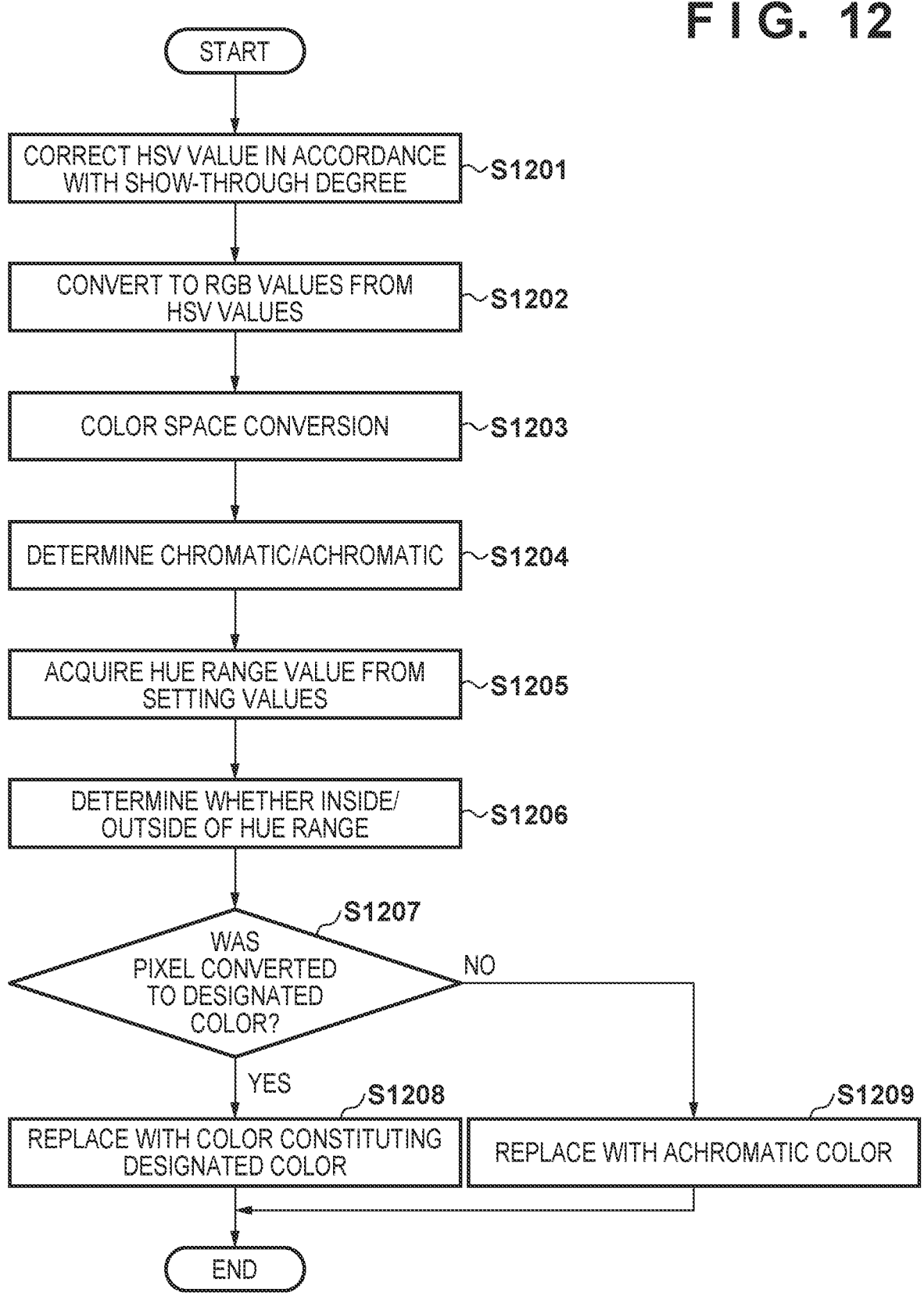
FIG. 12 is a flowchart showing show-through two-color conversion according to the embodiment shown in FIG. 11.

Subsequently, details of show-through two-color conversion processing in step S206 of this embodiment will be described with reference to FIG. 12. A color conversion unit 105 performs all the processes of steps in FIG. 12 as in the first embodiment. The processing to be described below is implemented such that the CPU 114 reads out, for example, programs stored in the storage device 112 connected to the image processing apparatus 100 to the RAM 113 and executes them.

Figure 11:
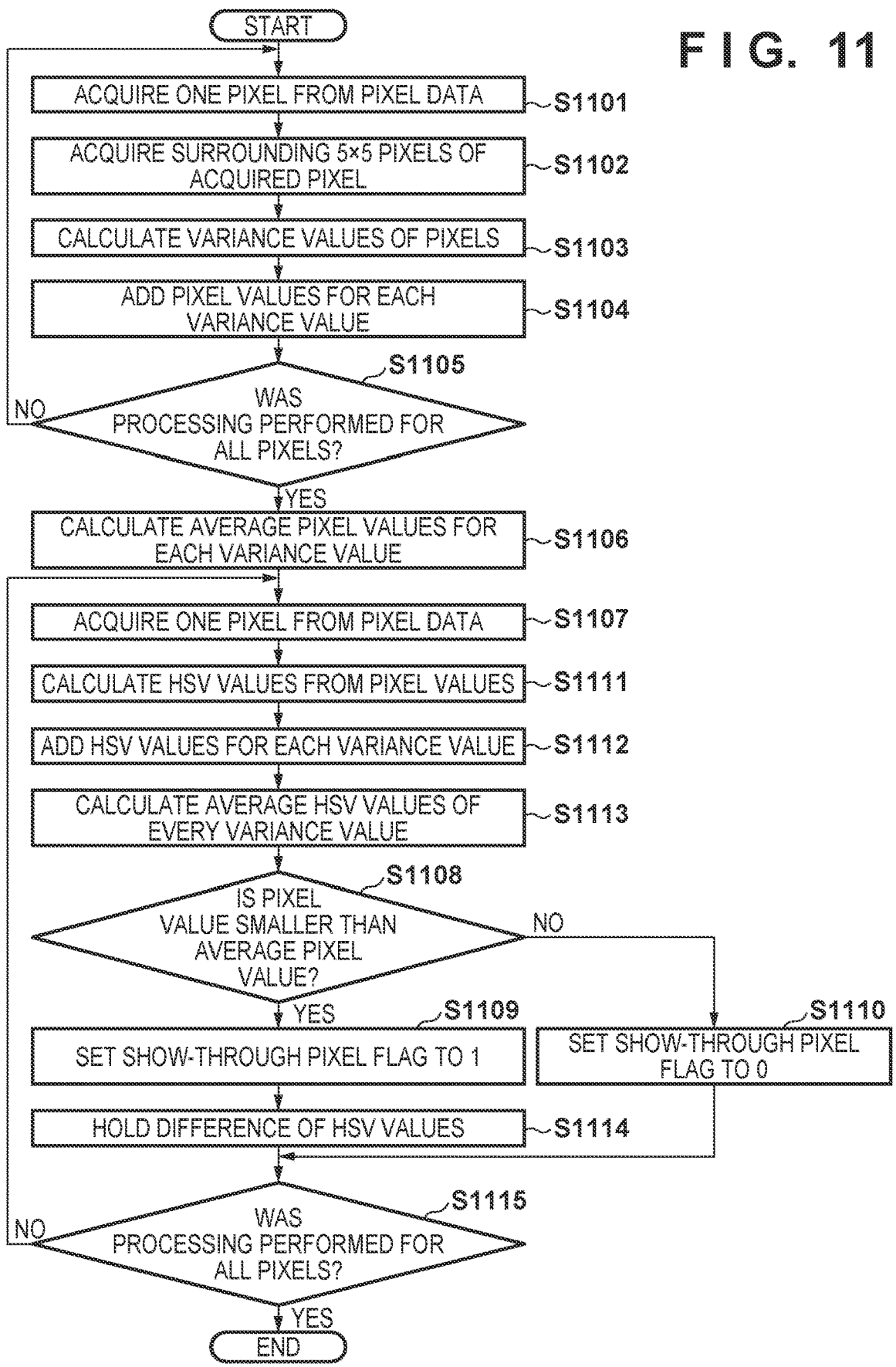
FIG. 11 is a flowchart showing show-through pixel determination according to another embodiment.

First, in step S1201, the color conversion unit 105 corrects the HSV values for each pixel calculated in step S1111 of FIG. 11 by using the difference values held in step S1114 of FIG. 11. The HSV values are corrected by:

$$Hm[n] = H[n] + Dh[n]$$

$$Sm[n] = S[n] + Ds[n]$$

$$Vm[n] = V[n] + Dv[n] \quad (21)$$

wherein Hm represents the corrected value of H, and n represents the nth pixel. Similarly, Sm and Vm are corrected pixel values of S and V, respectively.

Subsequently, in step S1202, the color conversion unit 105 converts the HSV values corrected in step S1201 into RGB values. The conversion from HSV to RGB is performed by:

$$MAX\ hsv = Vm[n]$$

$$MIN\ hsv = MAX\ hsv - ((Sm[n]/255) \times MAX\ hsv)$$

$$Rc[n] = MAX\ hsv$$

$$Gc[n] = (Hm[n]/60) \times (MAX\ hsv - MIN\ hsv) + MIN\ hsv$$

$$Bc[n] = MIN\ hsv$$

$$(0 < Hm[n] < 60)$$

$$Rc[n] = ((120 - Hm[n])/60) \times (MAX\ hsv - MIN\ hsv) + MIN\ hsv$$

$$Gc[n] = MAX\ hsv$$

$$Bc[n] = MIN\ hsv$$

$$(60 < Hm[n] < 120)$$

$$Rc[n] = MIN\ hsv$$

$$Gc[n] = MAX\ hsv$$

$$Bc[n] = ((Hm[n] - 120)/60) \times (MAX\ hsv - MIN\ hsv) + MIN\ hsv$$

$$(120 < Hm[n] < 180)$$

$$Rc[n] = MIN\ hsv$$

$$Gc[n] = ((240 - Hm[n])/60) \times (MAX\ hsv - MIN\ hsv) + MIN\ hsv$$

$$Bc[n] = MAX\ hsv$$

$$(180 < Hm[n] < 240)$$

$$Rc[n] = ((Hm[n] - 240)/60) \times (MAX\ hsv - MIN\ hsv) + MIN\ hsv$$

$$Gc[n] = MIN\ hsv$$

$$Bc[n] = MAX\ hsv$$

$$(240 < Hm[n] < 300)$$

$$Rc[n] = MAX\ hsv$$

$Gc[n]=\text{MIN } hsv$ $Bc[n]=((360-Hm[n])/60)\times(\text{MAX } hsv-\text{MIN } hsv)+\text{MIN } hsv$ $(300<Hm[n]<360)$ (22)

wherein Rc represents the R pixel value after conversion from HSV, Gc represents G pixel value after conversion from HSV, and Bc represents the B pixel value after conversion from HSV. n represents the nth pixel.

Figure 4:
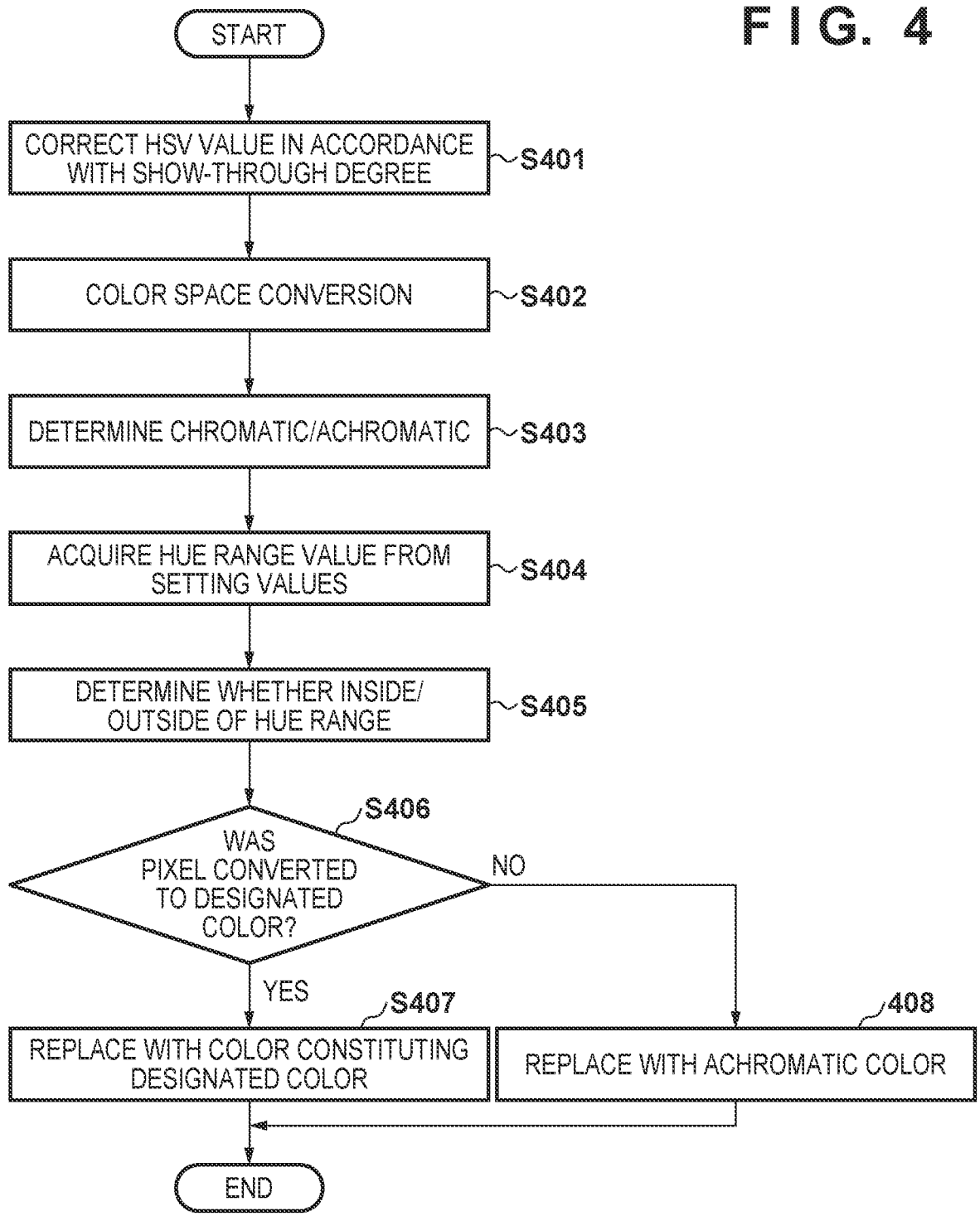
FIG. 4 is a flowchart of show-through two-color conversion according to the embodiment.

The processes from steps S1203 to S1209 are the same as those from steps S402 to S408 in FIG. 4, and a description thereof will be omitted.

As has been described above, the image processing apparatus according to this embodiment determines whether the show-through has occurred in each pixel of the read original image data. If it is determined that the show-through has occurred, the show-through of the pixel is corrected, and two-color conversion processing for converting the pixel into the user's designated color or the achromatic color is executed for the corrected image data. On the other hand, if it is determined that the show-through has not occurred, the two-color conversion processing is executed for the image data read from the pixel of the original. In addition, in this embodiment, the hue, saturation, and brightness values are obtained for all the read pixels in the show-through determination. At the same time, variance values representing the degrees of variations of the pixel values of the target pixel and the surrounding pixels are obtained. In addition, the average values of the hue, saturation, and brightness of the pixels having the same variance value are obtained, and the hue, saturation, and brightness values of each pixel are compared with the average values of the hue, saturation, and brightness of the variance values obtained for this pixel. After that, if the hue, saturation, brightness values of each pixel are smaller than the average values of the hue, saturation, and brightness of the variance values acquired for this pixel, it is determined that the show-through has occurred; otherwise, it is determined that the show-through has not occurred. Accordingly, even if a change in color type occurs due to the show-through, the pixel to be converted into the user's designated color can be converted into the user's designated color, and the pixel to be converted into the achromatic color can be converted into the achromatic color as in the case in which the show-through is absent in the show-through portion. As described above, according to this embodiment, even if the change in color type occurs, the show-through influence can be suitably reduced in the conversion processing to the chromatic color or the user's designated color when performing the two-color copying of the color original in which the show-through occurs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-184984 filed on Sep. 28, 2018, which is hereby incorporated by reference herein in its entirety.

What is claimed is:

1. An image processing apparatus comprising:

a user interface that designates a chromatic color;

a scanner that scans an image of a document; and a controller or a circuit that specifies, from among pixels in the image scanned by the scanner, a pixel at which a show-through has occurred, wherein the controller or the circuit increases a luminance value of the specified pixel, and wherein the controller or the circuit converts, based on the increased luminance value, a color of the specified pixel into one of an achromatic color and the chromatic color designated by the user interface.

2. The image processing apparatus according to claim 1, wherein the controller or the circuit specifies, based on a variance value obtained for the pixel, the pixel at which the show-through has occurred.

3. The image processing apparatus according to claim 2, wherein the variance value acquired for the pixel is a variance value representing a degree of variation of pixels including the pixel.

4. The image processing apparatus according to claim 1, wherein the controller or the circuit does not increase another luminance value of another pixel which is not specified as a pixel at which a show-through has occurred, and wherein the controller or the circuit converts, based on the increased luminance value, the color of the specified pixel into one of the achromatic color and the chromatic color designated by the user interface, and wherein the controller or the circuit converts, based on the another luminance value, the color of the another pixel into one of the achromatic color and the chromatic color designated by the user interface.

5. The image processing apparatus according to claim 2, wherein the controller or the circuit increases the specified pixel by adding, to the luminance value of the specified pixel, difference between the luminance value of the specified pixel and an average luminance value corresponding to the variance value acquired for the specified pixel.

6. The image processing apparatus according to claim 1, wherein the luminance value is a luminance value regarding to RGB.

7. The image processing apparatus according to claim 1, wherein the user interface designates the chromatic color among at least cyan (C), magenta (M), yellow (Y), red (R), green (G), and blue (B).

8. A method of controlling an image processing apparatus, the method comprising:
- designating a chromatic color;
- scanning an image of a document;
- specifying, from among pixels in the scanned image, a pixel at which a show-through has occurred;
- increasing a luminance value of the specified pixel; and
- converting, based on the increased luminance value, a color of the specified pixel into one of an achromatic color and the designated chromatic color.

9. A non-transitory computer-readable storage medium storing a computer program to cause a computer to execute steps in a method of controlling an image processing apparatus, the method comprising:
- designating a chromatic color;
- scanning an image of a document;
- specifying, from among pixels in the scanned image, a pixel at which a show-through has occurred;
- increasing a luminance value of the specified pixel; and
- converting, based on the increased luminance value, a color of the specified pixel into one of an achromatic color and the designated chromatic color.

10. An image processing apparatus comprising:
- a scanner that scans an image of a document; and
- a controller or a circuit that specifies, from among pixels in the image scanned by the scanner, a pixel at which a show-through has occurred,
- wherein the controller or the circuit increases a luminance value of the specified pixel, and
- wherein the controller or the circuit converts, based on the increased luminance value, a color of the specified pixel into one of an achromatic color and a predetermined chromatic color.

* * * * *